United States Patent
Greger et al.

(10) Patent No.: US 6,212,882 B1
(45) Date of Patent: Apr. 10, 2001

(54) ASSEMBLY, METHOD, AND MOTOR VEHICLE FOR CLEANING AMBIENT AIR IN THE VICINITY OF AN INTERNAL COMBUSTION ENGINE

(75) Inventors: Lars Greger, Angered; Göran Wirmark, Göteborg; Ingemar Gottberg, Västra Frölunda, all of (SE); Ronald M. Heck, Frenchtown, NJ (US); Jeffrey B. Hoke, North Brunswick, NJ (US); Terence C. Poles, Ringoes, NJ (US); Wayne M. Rudy, Morristown, NJ (US)

(73) Assignee: Volvo Personvagnar AB & Engelhard Corp., Gothenburg (SE)

( * ) Notice: Subject to any disclaimer, the term of this patent is extended or adjusted under 35 U.S.C. 154(b) by 0 days.

(21) Appl. No.: 09/391,637

(22) Filed: Sep. 7, 1999

(51) Int. Cl.$^7$ ...................................................... F01N 3/00
(52) U.S. Cl. ...................... 60/274; 423/219; 423/245.3; 423/247; 95/114; 95/116; 95/141; 95/148; 55/385.3; 96/143; 96/146
(58) Field of Search ................ 60/274, 278; 123/198 E, 123/704; 55/385.3, 356; 95/115, 138, 143, 148; 96/143, 146; 422/173, 180, 4; 423/219, 245.3, 247

(56) References Cited

U.S. PATENT DOCUMENTS

| | | |
|---|---|---|
| 3,738,088 | 6/1973 | Colosimo . |
| 4,824,363 * | 4/1989 | Abthoff et al. ....................... 422/180 |
| 5,004,487 * | 4/1991 | Kowalczyk ......................... 55/385.3 |
| 5,085,049 * | 2/1992 | Rim et al. ............................ 60/278 |
| 5,147,429 * | 9/1992 | Bartholomew et al. ............... 55/536 |
| 5,509,853 * | 4/1996 | Wells ................................... 55/385.3 |
| 5,676,913 * | 10/1997 | Cirillo et al. ........................ 423/219 |
| 5,787,706 | 8/1998 | Jobson et al. . |
| 5,814,287 | 9/1998 | Logan et al. . |
| 5,910,097 * | 6/1999 | Boegner et al. ....................... 60/278 |
| 5,948,355 * | 9/1999 | Fujishima et al. ...................... 422/4 |
| 5,997,831 * | 12/1999 | Dettling et al. ..................... 423/219 |

FOREIGN PATENT DOCUMENTS

| | | |
|---|---|---|
| 4007965 * | 9/1991 | (DE) . |
| 4318738 * | 7/1994 | (DE) . |
| 0691459 | 1/1996 | (EP) . |
| 0747581 | 12/1996 | (EP) . |
| WO 96/22146 | 7/1996 | (WO) . |
| WO 96/38658 | 12/1996 | (WO) . |
| WO 97/11769 | 4/1997 | (WO) . |

* cited by examiner

*Primary Examiner*—Thomas Denion
*Assistant Examiner*—Tu M. Nguyen
(74) *Attorney, Agent, or Firm*—Samuels, Gauthier & Stevens, LLP (57) ABSTRACT

An assembly, a method and a motor vehicle for cleaning ambient air in the vicinity of an internal combustion engine (102) having combustion air inlet means (103) and energy emitting means (104) are disclosed. The assembly (101) further includes adsorbent means (105) for adsorbing at least one pollutant when in a first mode of operation and for desorbing the pollutant when in a second mode of operation. The adsorbent means have an inlet (106) for polluted ambient air (107, 107') and an outlet (108) for cleaned ambient air (109, 109'). Furthermore, the assembly (101) includes a pollutant conduit (110) through which the desorbed pollutant is transferred from the adsorbent means (105) to the combustion air inlet means (103) when in the second mode of operation, and the adsorbent means (105) are arranged for being brought into the second mode of operation by means of energy supplied from the energy emitting means (104).

28 Claims, 5 Drawing Sheets

ASSEMBLY, METHOD, AND MOTOR VEHICLE FOR CLEANING AMBIENT AIR IN THE VICINITY OF AN INTERNAL COMBUSTION ENGINE

TECHNICAL FIELD

The present invention relates to an assembly for cleaning ambient air in the vicinity of an internal combustion engine. The invention also relates to a method for cleaning ambient air, utilizing the assembly, and to a motor vehicle provided with the assembly in accordance with the invention.

BACKGROUND OF THE INVENTION

The demands on cleaner and less harmful exhaust gases from internal combustion engines of e.g. motor vehicles are becoming more and more stringent, and the regulations concerning allowable emission levels specify an increasing number of chemical compounds.

Depending on the operating conditions and the composition of the ambient air, the exhaust gases from a modern motor vehicle might in fact be cleaner that the ambient air which is suctioned into the engine for the internal combustion. The reason for this is the greatly improved technology for controlling and cleaning the emissions from the internal combustion, e.g. by means of improved combustion control, catalytic converters and hydrocarbon traps in the exhaust gas system, etc.

Another previously known way of reducing the total environmental effects on the ambient air caused by an internal combustion engine of a motor vehicle is to provide the motor vehicle with means for active cleaning of the ambient air.

Accordingly, U.S. Pat. No. 3,738,088 (Colosimo) discloses an air filtering assembly for cleaning pollution from the ambient air in the path of the vehicle by means of using the vehicle and the assembly as a mobile cleaning device. According to U.S. Pat. No. 3,738,088, the ambient air is cleaned by means of being passed through filter means for removing relatively larger size particulate material and electronic precipitator means for removing relatively smaller size particulate material from the inlet air. The air filtering assembly can be provided with a post filter of catalytic, replaceable cartridge-type for cleaning the air of non-particulate or aerosol pollution such as carbon monoxide, unburned hydrocarbons, nitrous oxides, and/or sulphur oxides, and the like. The catalytic post filter is claimed to have an offsetting effect which might eliminate the need for a catalytic filter in the exhaust system of the vehicle. According to U.S. Pat. No. 3,738,088, ducting means may be utilized to direct the cleaned air from the filtering assembly to desired uses such as the fresh air or air conditioning system of the vehicle. Furthermore, the described air filtering assembly includes means for spraying a fluid into the filtering assembly for periodic cleaning and rejuvenating.

Furthermore, WO 96/22146 and WO 97/11769 disclose a method and apparatus for cleaning ambient air by the movement of a vehicle having at least one atmosphere contacting surface, and a pollutant treating composition located on said surface. In a specific embodiment, a method of coating a motor vehicle radiator with pollutant treating catalyst is disclosed. The atmosphere contacting surfaces preferably comprise a finned outer surface and are selected from the outer surface of the radiator, the air conditioner condenser, the surfaces of the radiator fan, engine oil cooler, transmission oil cooled, power steering fluid cooler and air charge cooler, wherein the outer surface of the air conditioner condenser and radiator are the most preferred. The polluting treating compositions are said to include catalyst compositions useful for catalyzing the conversion of pollutants to non-objectionable materials, or alternatively, adsorption compositions for adsorbing pollutants which can be destroyed upon adsorption, or stored for further treatment at a later time. In the case of adsorption compositions, hydrocarbons and particulate matter can be adsorbed and subsequently treated by desorption followed by catalytic reaction or incineration. Advantages of the disclosed method and apparatus are claimed to be that no additional filter or apparatus is required, and that no additional energy source or changes in the construction of method of operation of the motor vehicle are required. According to WO 96/22146 and WO 97/11769, a number of pollutants in the ambient air can be treated, e.g. carbon monoxide, different hydrocarbons, nitrogen oxides and sulfur oxides.

However, the previously known techniques for cleaning ambient air in the vicinity of a motor vehicle usually require that a filter cartridge or the like is replaced manually when it has been saturated with pollutants, or that a special, rather complicated system for periodic cleaning is provided.

Furthermore, the existing systems for cleaning ambient air do not make use of the possible heat content in the treated pollutants for the internal combustion.

SUMMARY OF THE INVENTION

Accordingly, a first object of the present invention is to provide an assembly for cleaning ambient air in the vicinity of an internal combustion engine, having a simple and reliable construction and an automatic function, and which furthermore makes use of the possible heat content in the pollutants removed from the ambient air in the cleaning process.

This first object is achieved, in accordance with claim 1, by means of an assembly in which an internal combustion engine has combustion air inlet means for providing air for internal combustion of an organic fuel resulting in an exhaust gas, and energy emitting means for emitting energy. The assembly further comprises adsorbent means for adsorbing at least one pollutant when in a first mode of operation and for desorbing the pollutant when in a second mode of operation. The adsorbent means have an inlet for polluted ambient air comprising the pollutant and an outlet for cleaned ambient air cleaned from the pollutant. Furthermore, the assembly comprises a pollutant conduit through which the desorbed pollutant is transferred from the adsorbent means to the combustion air inlet means when in the second mode of operation. Thereby, the adsorbent means are arranged for being brought into the second mode of operation by means of energy supplied from the energy emitting means.

A second object of the present invention is to provide a method for cleaning ambient air in the vicinity of an internal combustion engine which utilizes the assembly.

This second object is achieved, in accordance with claim 16, by means of the method comprising: to provide an internal combustion engine, having combustion air inlet means for providing air for internal combustion of an organic fuel, and energy emitting means for emitting energy. The method further comprises to provide adsorbent means having an inlet for polluted ambient air and an outlet for cleaned ambient air; to adsorb at least one pollutant in the adsorbent means when in a first mode of operation; and to desorb the adsorbed pollutant when in a second mode of operation. Furthermore, the method comprises: to provide a pollutant conduit; to bring the adsorbent means into the second mode of operation by means of the energy supplied from the energy emitting means; to transfer the desorbed pollutant from the adsorbent means to the combustion air inlet means through the pollutant conduit when in the second mode of operation; to combust the pollutant in the internal combustion engine in order to create an exhaust gas; and to bring the adsorbent means back into the first mode of operation.

A third object of the present invention is to provide a motor vehicle provided with the assembly and cleaning ambient air through the method according to the invention, which object is achieved in accordance with claim 29.

Further objects of the present invention will become evident from the following description, and the features enabling these further objects to be achieved can be found in the dependent claims.

BRIEF DESCRIPTION OF THE DRAWINGS

In the following, the invention will be described in greater detail with reference to the attached drawings, in which.

DETAILED DESCRIPTION OF THE PREFERRED EMBODIMENT

Figure 1:
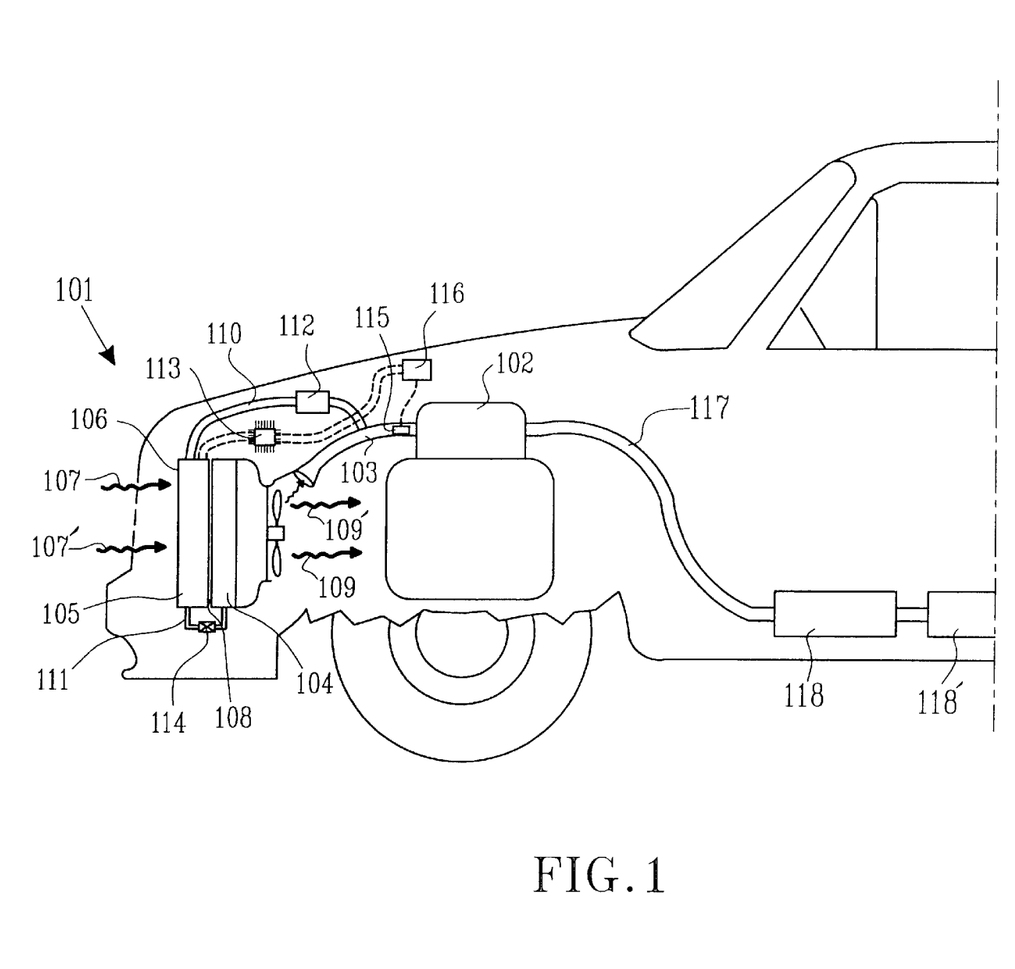
FIG. 1 shows a schematic side view of a preferred embodiment of the assembly according to the invention arranged in a passenger car.

In FIG. 1 a preferred embodiment of an assembly according to the invention is shown schematically, wherein for reasons of simplicity only the vehicle components necessary in order to understand the invention have been indicated.

The assembly 101 in the preferred embodiment comprises an internal combustion engine 102 of a conventional type, having combustion air inlet means 103 for providing air for internal combustion of an organic fuel resulting in an exhaust gas. However, the internal combustion engine and the fuel can be of any suitable type.

Furthermore, the assembly 101 comprises energy emitting means 104 for emitting energy.

The energy can be generated inside or due to operation of the internal combustion engine 102, wherein the energy emitting means 104 in the described embodiment comprises a radiator which belongs to the conventional cooling system of the internal combustion engine. Accordingly, in this embodiment the energy emitting means are constituted of the radiator which emits heat. However, as long as the supply of ambient air and emitted energy are sufficient for operating the assembly according to the invention, it is also conceivable with embodiments of the invention in which the energy emitting means comprise an air conditioner condenser, an engine oil cooling circuit (204, see FIG. 2), a transmission oil cooler, a power steering fluid cooler, an air charge cooler, an electric generator or ambient air moving in relation to a vehicle. Furthermore, it is also conceivable with embodiments, in which the energy emitting means comprise solar cells, a wind power generator, a fuel burner, fuel cells, external electricity, or another suitable energy source.

The assembly 101 further comprises adsorbent means 105 for adsorbing at least one pollutant when in a first mode of operation and for desorbing said pollutant when in a second mode of operation, wherein the adsorbent means 105 have an inlet 106 for polluted ambient air 107, 107' comprising the pollutant (or pollutants) and an outlet 108 for cleaned ambient air 109, 109' cleaned from the pollutant.

The pollutant in the ambient air, which is to be removed by means of the assembly according to the invention, can be of any type occurring in the ambient air, and typically comprises carbon monoxide, unsaturated hydrocarbon compounds, partially oxygenated hydrocarbons, nitrogen oxides, ozone or sulfur oxides, i.e. pollutants originating from the combustion of organic fuels, as well as evaporative emissions, including hydrocarbons.

The adsorbent means 105 can be of any type suitable for the purpose, and advantageously comprise a pelleted or granular material, a monolithic honeycomb, a ceramic foam or a honeycomb filter containing or coated with an adsorption-promoting agent such as a zeolite, cordierite, active carbon, mullite or silicon carbide, which enables the adsorbent means 105 to act as a combined mechanical and chemical trap for the pollutant(s) when in the first mode of operation. In the preferred embodiment, the adsorbent means 105 are constituted of a monolithic honeycomb filter coated with a zeolite in a casing and with dimensions which are adapted to the dimensions of the radiator, so that a pathway for the polluted ambient air 107, 107' passes through both the adsorbent means 101 and the energy emitting means 104. It is also conceivable with embodiments in which the vehicle radiator or the A/C condenser constitutes a supporting structure for the adsorbent means. Useful adsorbent materials are disclosed in WO 96/22146.

Furthermore, the assembly 101 according to the invention comprises a pollutant conduit, such as a pollutant transfer line 110, through which the desorbed pollutant is transferred from the adsorbent means 105 to the combustion air inlet means 103 when in the second mode of operation, wherein the pollutant conduit in the described embodiment is a tube of stainless steel. However, it is also conceivable with pollutant conduits of another suitable material with a sufficiently high chemical resistance against the occurring pollutants, e.g. a suitable polymer material. The adsorbent means 105 of the assembly according to the invention are arranged so that they can be brought into the second mode of operation by means of energy supplied from the energy emitting means 104, which in the described embodiment is the radiator. However, as mentioned above, it is also conceivable with other types of energy emitting means.

In the preferred embodiment, the assembly 101 further comprises an energy transfer means 111 for transferring the energy from the energy emitting means 104 to the adsorbent means 105 by means of an energy carrier, which in the described embodiment is a cooling medium of a conventional type for use in internal combustion engines, provided from the cooling system of the internal combustion engine 102. In the described embodiment, this is accomplished by means of an aluminium alloy tube from the radiator arranged in a zig-zag like pattern on both the upstream and the downstream surfaces of the monolithic honeycomb structure of the adsorbent means. Alternatively, the tube can pass through the energy emitting means 104 in a pattern generally parallel to the inlet surface 106 and the outlet surface, in a similar way as in a radiator. However, depending on the position of the assembly in relation to the internal combustion engine, it is also conceivable with embodiments of the invention in which the energy carrier is motor oil or charge air. Furthermore, it is also conceivable with embodiments of the assembly according to the invention where the energy transfer from the energy emitting means 104 to the adsorbent means 105 has been accomplished in another suitable way, e.g. by means of an electrical current, air pressure, microwaves, IR-heating. It is also conceivable with embodiments of the invention in which the desorption of pollutant involves the use of vacuum, humid air pulse, steam, etc.

The assembly according to the preferred embodiment of the invention further comprises pollutant transport means 112 for transporting the desorbed pollutant through the pollutant conduit 110 when activated. In the preferred embodiment, the pollutant transport means 112 are constituted of an electrical fan which suctions the desorbed pollutant from the adsorbent means 105 into the pollutant conduit 110 and blows the pollutant further into the combustion air inlet means 103. Thereby, the adsorbent means 105 are preferably provided with suitable air blocking means (not shown in FIG. 1), which partially or completely closes the outlet 108 in order to ensure that the ambient air 107, 107' is led through the adsorbent means 105 and further into the pollutant conduit 110 when in the second mode of operation. However, it is also conceivable with pollutant transport means of another suitable type. Accordingly, it is also conceivable with embodiments of the assembly according to the invention in which the force required for transporting the pollutant is provided by the air pressure, generated by moving ambient air from a suitable blower belonging to the internal combustion engine, or by the movement of the motor vehicle. In such embodiments, the air pressure created by moving ambient air (207", see FIG. 2) constitutes the pollutant transport means.

In the preferred embodiment, the assembly also comprises mode control means 113 for acting on the energy transfer means 111 and the pollutant transport means 112 in order to maintain a first energy level in the adsorbent means 105 and to deactivate the pollutant transport means 112 when in the first mode of operation, and in order to maintain a second energy level, higher than the first energy level, in the adsorbent means 105 and to activate the pollutant transport means 112 when in the second mode of operation. In the described embodiment, the energy levels correspond to two different temperatures, wherein the mode control means 113 comprise a microprocessor, a temperature sensor arranged inside the adsorption means, a temperature signal line between the temperature sensor and the microprocessor, a control signal line between the microprocessor and the pollutant transport means and a control signal line between the microprocessor and a valve or the like in the energy transfer means. However, in another embodiment, the energy carrier is an electrical current supplied from a generator belonging to the internal combustion engine. The electricity can be used to regulate the temperature to the desired energy level, e.g. by means of suitably arranged resistor elements integrated into the adsorbent means.

Alternatively, the electricity can be used for agitating the adsorbent means into the desired energy level, e.g. by means of an ultrasonic device. Furthermore, the control system can be of another type which is suitable for the purpose.

Figure 2:
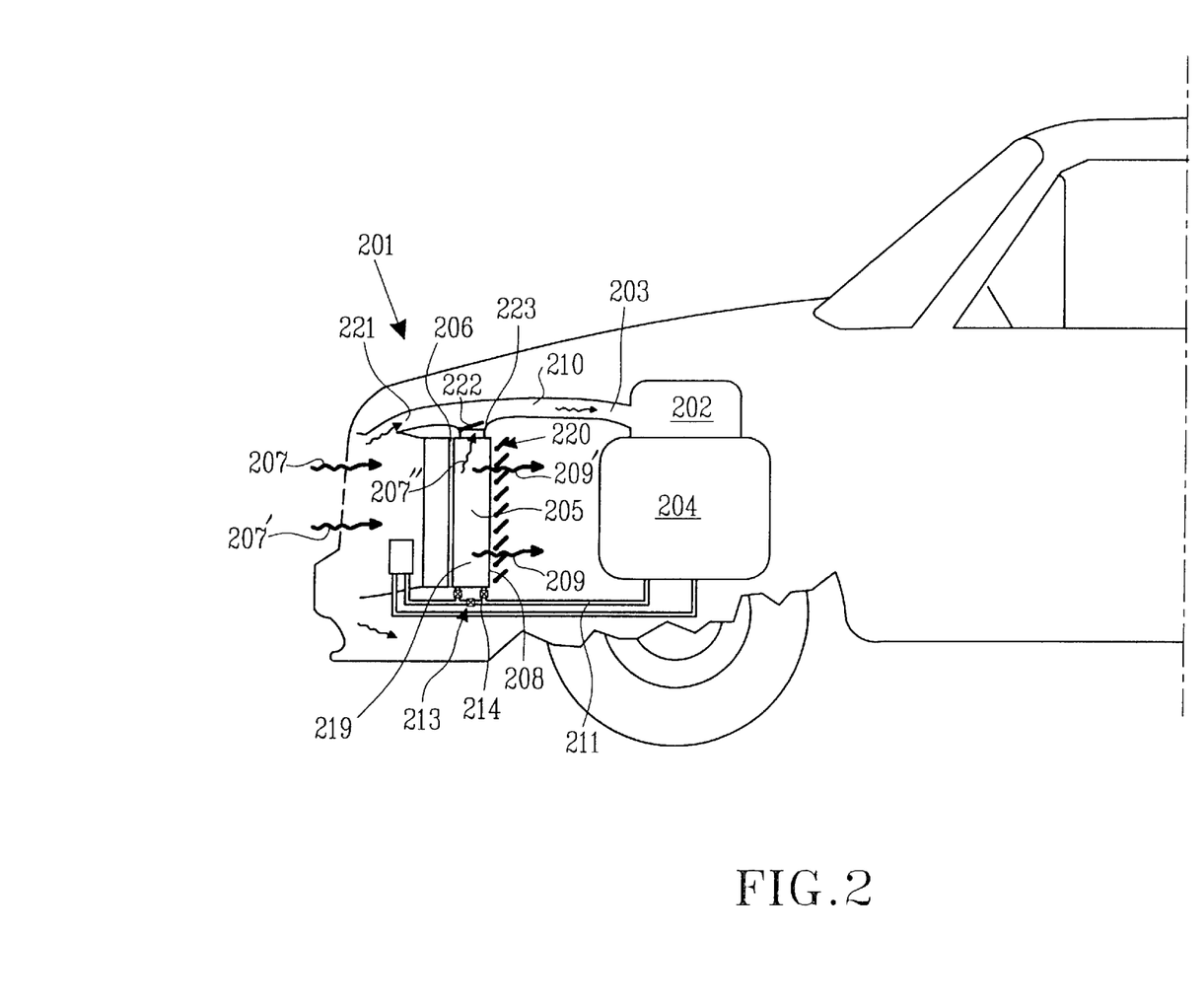
FIG. 2 shows a schematic side view of a particularly preferred embodiment of the assembly according to the invention.
Figure 3A:
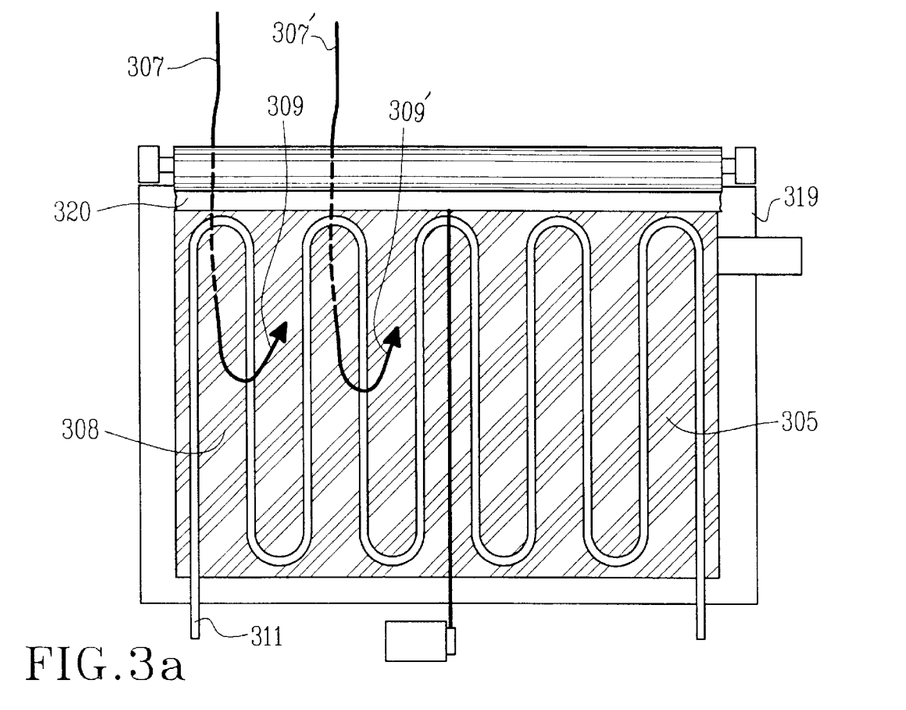
FIG. 3A shows a schematic view from the outlet side of adsorbent means belonging to an assembly according to an alternative embodiment of the invention, when in the first mode of operation.
Figure 3B:
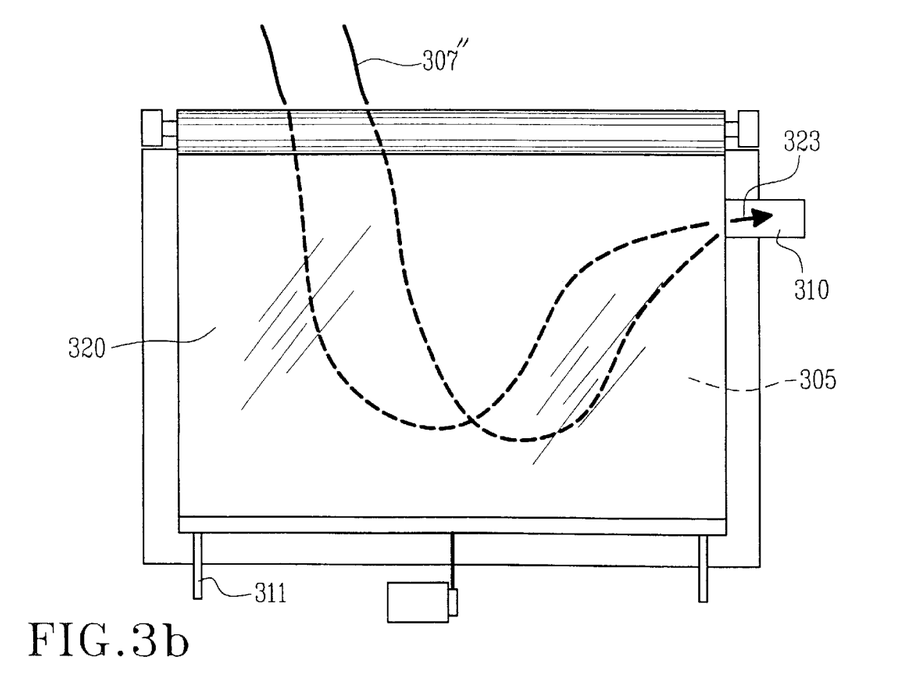
FIG. 3B shows a schematic view from the outlet side of the adsorbent means in FIG. 3A, but when in the second mode of operation.

In a particularly preferred embodiment of the assembly 201 according to the invention, illustrated most clearly in FIGS. 2 and 3A–3B, the adsorbent means 205; 305 are enclosed partially by an air-impermeable casing 219; 319, i.e. which leaves the inlet 206 and the outlet 208; 308 essentially uncovered. Thereby, the mode control means comprise air blocking means 220; 320 arranged close to the outlet 208; 308 of the adsorbent means so that at least part of the ambient air 209,209'; 309,309' is allowed to exit through the outlet 208; 308 when in the first mode operation (wherein pollutant in the ambient air 209, 209'; 309, 309' is adsorbed in the adsorbent means), and so that at least part of the ambient air 207"; 307" is prevented from exiting through the outlet 208; 308 and instead is guided into the pollutant conduit 210; 310 when in the second mode of operation (wherein pollutant is desorbed from the adsorbent means into the ambient air 207"; 307"). Thereby, air blocking means 220; 320 refer to any suitable means, such as louvers, being able to at least partially close the passage for ambient air through the adsorbent means 205; 305. It should be noted that the air-blocking means 220 in FIG. 2 are of a different type than the air blocking means 320 shown in FIGS. 3A and 3B.

In the particularly preferred embodiment, the ambient air 207"; 307" can, when this is desired/necessary, be prevented from escaping through the outlet 208; 308 by means of the air blocking means 220; 320. This will create an air pressure acting on the adsorption means 205; 305. The air pressure can be sufficient in itself in order to bring the adsorbent means into the second mode of operation, i.e. the desorption phase, and/or can provide the force required for transporting the ambient air 223; 323 with desorbed pollutant through the pollutant conduit 210; 310. Thereby, suitable sealing means (not shown in the drawings), e.g. strips having a suitable cross-sectional shape, can be provided on the air-impermeable casing 219; 319 in order to ensure an air-impermeable sealing when the air-blocking means are in their closed position as shown in FIG. 3B.

In an alternative embodiment, best illustrated in FIG. 2, the assembly 201 further comprises an air intake channel 221. In this embodiment, the mode control means comprise air valve means 222 arranged for allowing ambient air 207 through the air intake channel 221 into the combustion air inlet means 203 when in the first mode of operation, and for closing said air intake channel 221 for the ambient air 207 when in the second mode of operation.

In this alternative embodiment, part of the ambient air 207 enters the air intake channel 221 when in the first mode of operation. When entering the second mode of operation, i.e. the desorption of adsorbed pollutant, the air valve means 222 are brought into a position closing the air intake channel 221 for entering ambient air 207, at the same time as the air blocking means 220 are closing the outlet 208 for ambient air 209 downstream the adsorbent means 205. In this way, at least part of the ambient air 207" will be guided through the adsorbent means 205 in order to accumulate desorbed pollutant when in the second mode of operation and thereafter be forced through an opening 223 in the casing 219 of the adsorbent means 205 into the intake channel (i.e. the pollutant conduit 210) and further into the combustion air inlet means 203 by means of the air pressure generated from the moving ambient air 207', 207" the air blocking means closes the outlet 208. It should be noted that the ambient air is moving in relation to the vehicle in which the assembly has been mounted either because the vehicle is moving through the ambient air, or because a blower or the like has brought the ambient air into movement. Accordingly, in this embodiment the pollutant conduit 210 is a portion of the air intake channel 221. However, it is also conceivable with embodiments in which the air with desorbed pollutant is directed into the pollutant conduit in another suitable way when in the second mode of operation, e.g. embodiments where no air valve means are required.

Figure 4:
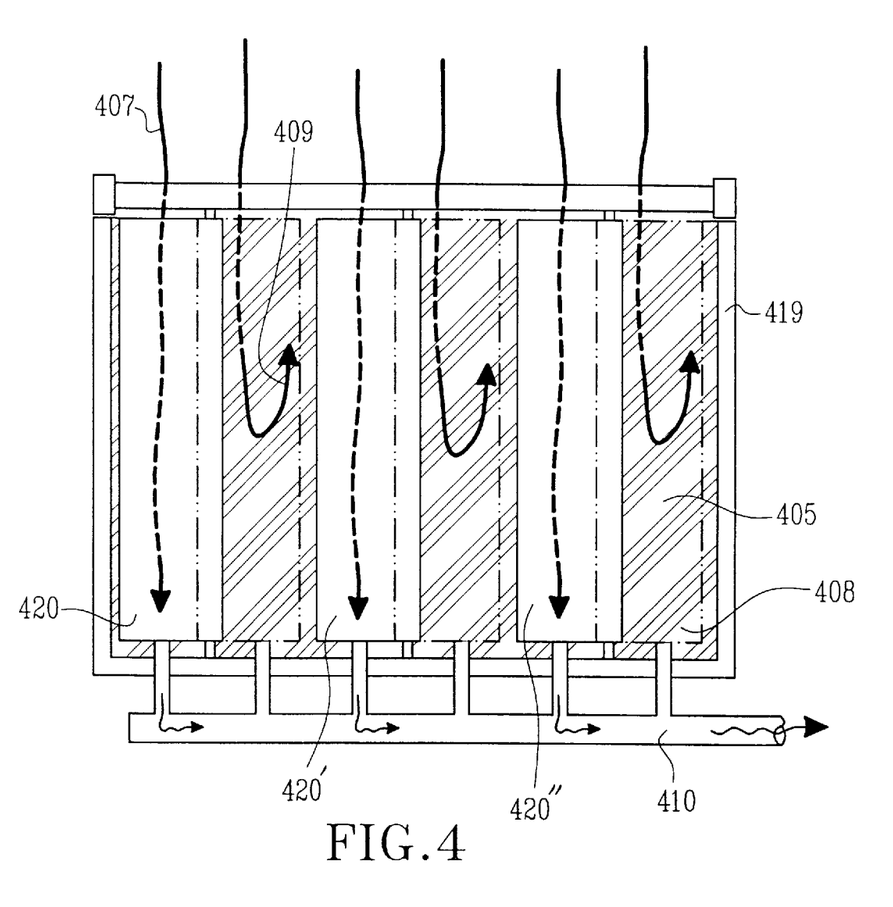
FIG. 4 shows a schematic view from the outlet side of an adsorbent means belonging to an assembly according to another alternative embodiment of the invention.

In another, advantageous embodiment of the assembly according to the invention, which is illustrated in FIG. 4, the air blocking means 420; 420'; 420" are arranged for allowing ambient air 409 to exit through the outlet 408 from first regions of the adsorbent means which are in the first mode of the operation, and for blocking the outlet for ambient air 407 from second regions of the adsorbent means 405 which are in the second mode of operation simultaneously as the first regions are in the first mode of operation, and for guiding the ambient air 407 through the first regions into the pollutant conduit 410. In this embodiment, the outlet surface 408 of the adsorbent means is preferably divided into a number of compartments, corresponding to the number of possible positions of the individual air blocking means 420; 420'; 420", by means of intermediate partitions. In this way, the individual air blocking means 420'; 420" can either be in sealing contact with the intermediate partitions (not shown), or if turned into an edge position (as means 420 in FIG. 4), in sealing contact with both the air-impermeable casing 419 and an intermediate partition (not shown). In this way, the ambient air can be prevented from escaping in an undesired direction.

As mentioned above, the air blocking means can be of any suitable design, and e.g. comprise one or several sets of roller blinds (such as louvers) or revolving shutters. Thereby, the assembly 101 in FIG. 1 can conveniently be provided with air blocking means 320 of roller blind type, as illustrated in FIGS. 3A–B, arranged between the adsorbent means 105 and the radiator 104. The assembly 201, illustrated in FIG. 2, is provided with air blocking means in the form of horizontal revolving shutters 220, whereas the adsorbent means illustrated in FIG. 4 are provided with vertical revolving shutters 420, 420', 420".

In another embodiment according to the invention, the assembly 101 further comprises energy valve means 114; 214 for at least partially opening or closing the energy transfer means 111; 211, wherein the mode control means 113; 213, e.g. the microprocessor, control valves, electrical switches etc., are arranged for causing the energy valve means 114; 214 to at least partially close when approaching or in said first mode of operation, and to at least partially open when approaching or in the second mode of operation. In the embodiments shown in FIGS. 1 and 2, the energy valve means 114; 214 are constituted of conventional, electronically regulated, control valves installed in the energy transfer means 111; 211. However, depending on the type of energy carrier, the energy valve means can also comprise different types of air valves, electrical switches, electronic components, or other suitable valve means.

In still another embodiment, the assembly further comprises means (not shown) for controlling the energy level of the energy carrier before it reaches the adsorbent means. This embodiment requires a suitable system for controlling the energy level, e.g. the temperature, of the energy carrier before it arrives to the adsorbent means, e.g. an arrangement (not shown) in which part of the energy carrier stream is brought through a cooling device or the like and thereafter is remixed into the residual energy carrier stream. This embodiment provides a possibility to optimize the adsorption of pollutant in the adsorption means by means of ensuring that the temperature inside the adsorption means, when in the first mode of operation, remains below the desorption temperature. This might be useful in hot climates where the cooling effect of the passing ambient air might become insufficient.

In another advantageous embodiment, the assembly 101 further comprises detecting means 115 for detecting an air/fuel ratio between the air for internal combustion and the organic fuel, and combustion control means 116 for adjusting the ratio. Such means are previously well-known and are useful for taking care of variations in the air/fuel supply composition which might occur e.g. when the assembly according to the invention is switching from the first mode (adsorption) to the second mode (desorption). In this advantageous embodiment, the mode control means 113 and the detecting means 115 are arranged for providing information to the combustion control means 116 used for controlling the air/fuel ratio. This is important, since e.g. hydrocarbons which are desorbed when in the second mode of operation otherwise could reduce the air/fuel ratio and, consequently, disturb the normal internal combustion. Accordingly, this embodiment ensures that the air/fuel ratio remains at the desired value also when switching over from the first mode of operation to the second, or vice versa.

In another embodiment, the assembly 101 is arranged so that a pathway for the ambient air 107,107' passes through both the energy emitting means 104 and the adsorbent means 105, wherein the energy emitting means and the adsorbent means are arranged next to each other. In the embodiment shown in FIG. 1, this is accomplished by means of the adsorbent means 105 being arranged directly in front of the energy emitting means, i.e. the radiator 104, thereby enabling the same stream of ambient air 107, 107' pass through both the adsorbent means 105 and the radiator 104. This embodiment allows for a very compact design of the assembly, since no long pipes or conduits are necessary in order to achieve the desired energy transfer from the energy emitting means, e.g. the radiator 104, to the adsorbent means 105 when entering or in the second mode of operation.

In a particularly advantageous embodiment of the assembly according to the invention, the internal combustion engine 102 further comprises exhaust gas outlet means 117 for emitting the exhaust gas into the ambient air via exhaust gas purifying means 118, 118', which in the preferred embodiment comprise both a hydrocarbon trap 118 and a catalytic converter 118'. However, even if less preferred, it is also conceivable with embodiments of the invention in which only a catalytic converter is provided or wherein no exhaust gas purifying means are provided.

In the following, a preferred embodiment of a method according to the invention will be described with reference to FIGS. 1 to 4.

Thereby, the method according to the invention comprises providing an internal combustion engine 102; 202 having combustion air inlet means 103; 203 for providing air for internal combustion of an organic fuel, and energy emitting means 104; 204 for emitting energy. Furthermore, the method comprises providing adsorbent means 105 ; 205; 305; 405 having an in let 106; 206 for polluted ambient air 107, 107'; 207, 207', 307, 307'; 407 and an outlet 108; 208;

308; 408 for cleaned ambient air 109, 109'; 209, 209', 309, 309'; 409. The method further comprises the steps of: adsorbing at least one pollutant in the adsorbent means 105; 205; 305; 405 when in a first mode of operation and desorbing the adsorbed pollutant when in a second mode of operation.

According to the invention and the preferred embodiment, the method further comprises to provide a pollutant conduit, e.g. a pollutant transfer line 110; 210; 310; 410; bringing the adsorbent means in to the second mode of operation by means of the energy supplied from the energy emitting means 104; 204; to transfer the desorbed pollutant from the adsorbent means 105; 205; 305; 405 to the combustion air inlet means 103; 203 through the pollutant conduit when in the second mode of operation; to combust the pollutant in the internal combustion engine 102; 202 in order to create an exhaust gas; and bringing the adsorbent means 105; 205; 305; 405 back into the first mode of operation.

In another embodiment, the method further comprises: providing an energy transfer means, e.g. an energy carrier line 111; 211, for transferring the energy from the energy emitting means 104; 204 to the adsorbent means 105; 205 by means of an energy carrier; to provide pollutant transport means 112; 212 for transporting the desorbed pollutant through the pollutant conduit 110; 210 when activated; and to provide mode control means 113; 213, 220, 222 for acting on the energy transfer means 111; 211 and the pollutant transport means 112; 207". In this embodiment, the method further comprises maintaining a first energy level in the adsorbent means 105; 205 and deactivating the pollutant transport means 112; 207" by means of the mode control means in order to induce the first mode of operation and adsorption of the pollutant; and to maintain a second energy level, higher than the first energy level, in the adsorbent means 105; 205 and activate the pollutant transport means 112; 212 by means of the mode control means in order to induce said second mode of operation and desorption of the pollutant. In this embodiment, the two energy levels are preferably two different temperatures, but can alternatively be two different electrical powers, two different pressures or two different levels of mechanical agitation.

In a particularly preferred embodiment of the method according to the invention, air blocking means 220; 320; 420. 420', 420" are provided and induce entry into the second mode of operation by means of blocking the passage for ambient air through at least a region of the adsorbent means, wherein the air blocking means induce entry into the first mode of operation by means of opening the passage for ambient air through said region of the adsorbent means.

In another advantageous embodiment, the method according to the invention further comprises: to provide energy valve means 114; 214 for at least partially opening or closing the energy transfer means 111; 211; and, by means of the mode control means 113; 213, to cause the energy valve means 114; 214 to at least partially close when inducing or in the first mode of operation and to at least partially open when inducing or in the second mode of operation.

In another embodiment, means (not shown in the drawings) for controlling the energy level of the energy carrier before it reaches the adsorbent means are provided and induce entry into the first or second mode of operation.

In another alternative embodiment, the method further comprises to provide detecting means 115 for detecting an air/fuel ratio between the air for internal combustion and the organic fuel, and combustion control means 116 for adjusting the air/fuel ratio, wherein the mode control means 113 and the detecting means 115 provide information to the combustion control means 116 which are used for controlling the air/fuel ratio. This embodiment ensures that the air/fuel ratio remains at the desired value also when switching over from the first mode of operation to the second, or vice versa.

In still another embodiment, the polluted ambient air 107, 107' passes through both the energy emitting means 104 and the adsorbent means 105, wherein the adsorbent means and energy emitting means are arranged next to each other.

In a particularly advantageous embodiment of the method according to the invention, the internal combustion engine 102 is provided with exhaust gas outlet means 117 which emit the exhaust gas into the ambient air via exhaust gas purifying means 118, 118' when the internal combustion engine 102 is running. Thereby, the exhaust gas purifying means 118, 118' preferably comprise both a hydrocarbon trap 118 and a catalytic converter 118'. In this embodiment, the existing exhaust gas purifying system is utilized in order to further clean the ambient air.

In another embodiment of the method according to the invention, the energy emitting means comprise a radiator 104, an air conditioner condenser, an engine oil cooling circuit 204, a transmission oil cooler, a power steering fluid cooler, an air charge cooler, an electric generator or ambient air moving in relation to a vehicle. Thereby, the energy carrier preferably comprises cooling medium, motor oil, charge air, electricity or ambient air.

According to another embodiment, the pollutant comprises carbon monoxide, hydrocarbons, including unsaturated hydrocarbon compounds and partially oxygenated hydrocarbons, nitrogen oxides, ozone or sulfur oxides.

In still another embodiment of the method according to the invention, the adsorbent means 105; 205; 305; 405 comprise a pelleted or granular material, a monolithic honeycomb, a foam, such as a ceramic foam, or a honeycomb filter containing or coated with an adsorption-promoting agent such as a zeolite, cordierite, active carbon, mullite or silicon carbide, whereby the adsorbent means act as a combined mechanical and chemical trap for the pollutant(s) when in said first mode of operation. Further suitable adsorbents are disclosed in the above-mentioned WO 96/22146, e.g. Group IIA alkaline earth metal oxides such as calcium oxide. It is also conceivable with embodiments of the method which involve the use of an adsorbing wheel, a moving adsorbing strip or belt, etc., i.e. embodiments in which the adsorbent means are located on or consist of a movable element. Such embodiments can further facilitate the switch-over between the first and the second mode of operation, or vice versa.

When practising the method according to the invention, the energy levels (e.g. temperatures) for switching over from the first mode of operation to the second, or vice versa, are dependent of the type of adsorbent means and pollutant in question. Accordingly, the energy levels have to be adapted to each individual case.

Figure 5A:
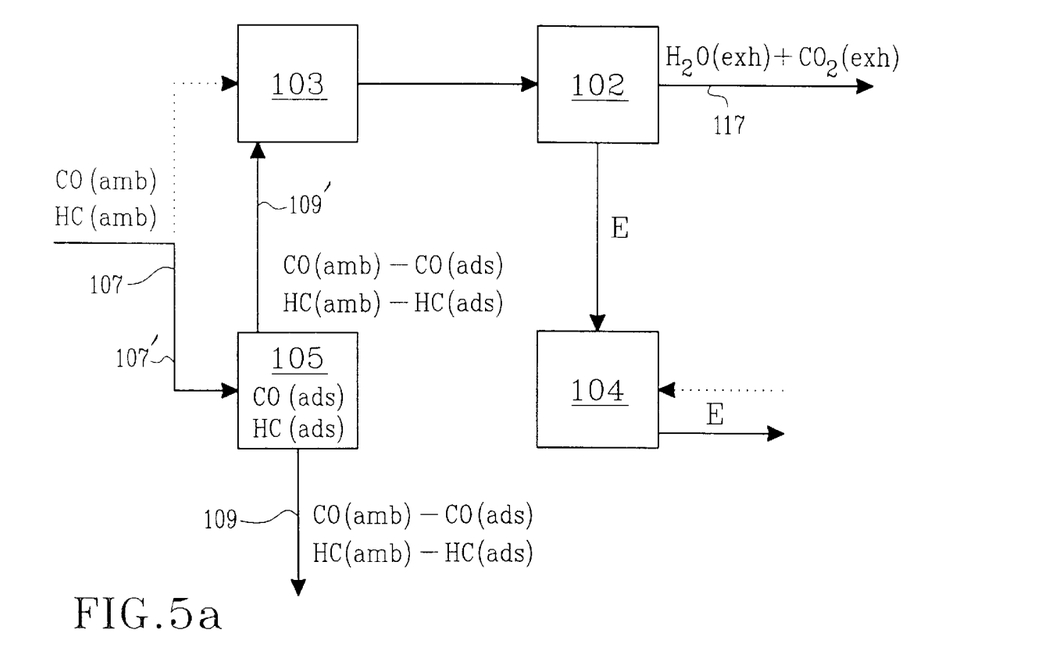
FIG. 5A is a schematic flow sheet which illustrates the method according to the invention when in the first mode of operation.
Figure 5B:
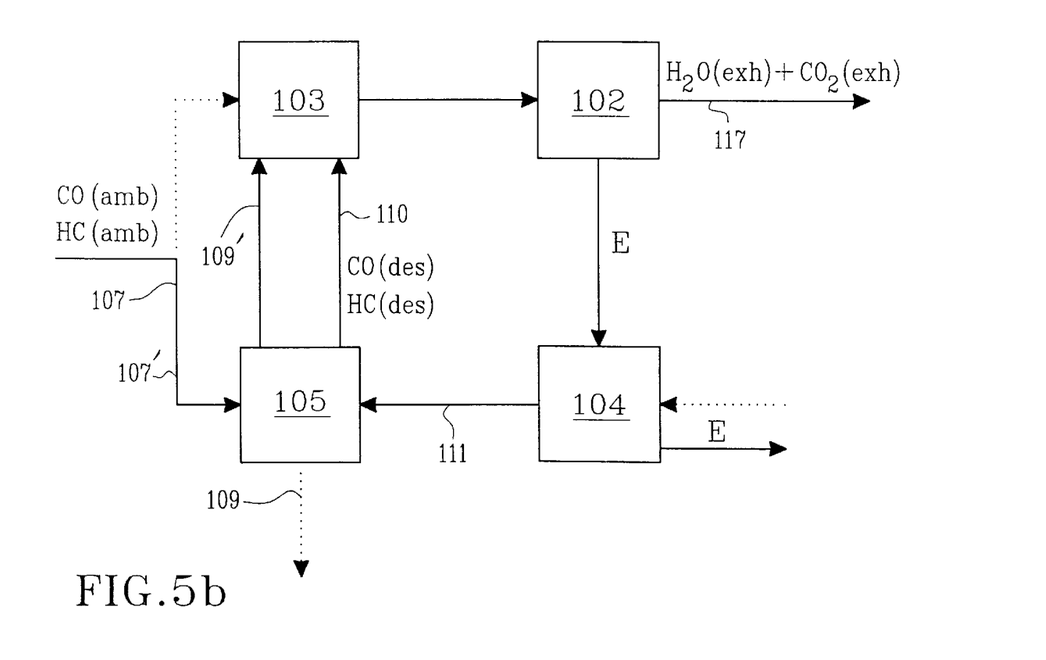
FIG. 5B is a schematic flow sheet which illustrates the method according to the invention when in the second mode of operation.

FIGS. 5A and 5B are schematic flow sheets further illustrating an embodiment of the method according to the invention in a simplified way, wherein FIG. 5A illustrates the first mode of operation and FIG. 5B illustrates the second mode of operation.

When in the first mode of operation, as illustrated in FIG. 5A, ambient air 107; 107' comprising at least one pollutant CO(amb), HC(amb) is passed through the adsorbent means 105, wherein the pollutant(s) CO(ads), HC(ads) is/are adsorbed. A first portion 109 or all the cleaned ambient air from the adsorbent means 105 is discharged into the environment, wherein the pollutant content CO(amb)—CO (ads), HC(amb)—HC(ads) has been reduced. A second portion of the cleaned ambient air 109' from the adsorbent means 105 can be brought to combustion air inlet means 103 and further to the internal combustion engine 102. Alternatively, also uncleaned ambient air 107 can be utilised for the combustion, so that all (or a portion of) the cleaned ambient air 109, 109' is discharged directly into the environment.

When in the second mode of operation, as illustrated in FIG. 5b, energy emitting means 104 are emitting energy E, which is supplied 11 to the adsorbent means 105 in order to bring the adsorbent means 105 into the second mode of operation, wherein the previously adsorbed pollutants are desorbed. The desorbed pollutants CO(des), HC(des) are transferred from the adsorbent means 105 to the combustion air inlet means 103 through a pollutant conduit 110, and further into the internal combustion engine 102. After the internal combustion, the exhaust gases comprising combusted pollutant $H2O(exh)+CO2(exh)$ are discharged into the environment through exhaust gas outlet means 117, either directly or preferably via exhaust gas purifying means.

In a particularly advantageous embodiment of the invention, a motor vehicle for cleaning ambient air in the vicinity of an internal combustion engine is provided, wherein the motor vehicle is provided with an assembly according to the invention and cleans the ambient air by means of a method according to the invention, preferably but not exclusively when the internal combustion engine is running.

Furthermore, the above-mentioned mode control means which control the switch-over from the first to the second mode of operation and vice versa, can be controlled by means of a suitable micro-processor, which gets input from appropriate sensors. Furthermore, a memory bank can be built up from experience values and be used for programming the micro-processor. Also a regular timing device can be used for controlling the mode control means.

The present invention should not be regarded as being limited to what has been described above in connection with the different embodiments, or to what is shown in the appended drawings, but its scope is defined by the following claims.

What is claimed is:

1. An assembly for cleaning ambient air in the vicinity of an internal combustion engine, said internal combustion engine having combustion air inlet means for providing air for internal combustion of an organic fuel resulting in an exhaust gas, energy emitting means for emitting energy, said assembly further comprising adsorbent means for adsorbing at least one pollutant when in a first mode of operation and for desorbing said pollutant when in a second mode of operation, said adsorbent means having an inlet for polluted ambient air comprising said pollutant and an outlet for cleaned ambient air cleaned from said pollutant, the assembly (101; 201) further comprises a pollutant conduit to said combustion air inlet means when in said second mode of operation, and said adsorbent means are arranged for being brought into said second mode of operation by means of energy supplied from said energy emitting means.

2. An assembly according to claim 1, wherein the assembly further comprises an energy transfer means for transferring said energy from said energy emitting means to said adsorbent means by means of an energy carrier, pollutant transport means for transporting said desorbed pollutant through said pollutant conduit when activated, and mode control means for acting on said energy transfer means. and said pollutant transport means in order to maintain a first energy level in said adsorbent means and to deactivate said pollutant transport means when in said first mode of operation, and in order to maintain a second energy level, higher than said first energy level, in said adsorbent means and to activate said pollutant transport means when in said second mode of operation.

3. An assembly according to claim 2, wherein the assembly further comprises an air intake channel and that said mode control means comprise air valve means arranged for allowing ambient air through said air intake channel into the combustion air inlet means when in the first mode of operation, and for closing said air intake channel for said ambient air when in the second mode of operation.

4. An assembly according to claim 2, wherein the assembly further comprises means for controlling the energy level of the energy carrier before the energy carrier reaches the adsorbent means.

5. An assembly according to claim 2, wherein the adsorbent means are enclosed partially by an air-impermeable casing, and that said mode control means comprise air blocking means arranged close to the outlet of said adsorbent means so that at least part of the ambient air is allowed to exit through the outlet when in the first mode operation, and so that at least part of the ambient air is prevented from exiting through said outlet and instead is guided into the pollutant conduit when in the second mode of operation.

6. An assembly according to claim 5, wherein the air blocking means are arranged for allowing ambient air to exit through the outlet form first regions of the adsorbent means which are in the first mode of the operation, and that said air blocking means further are arranged for blocking the outlet for ambient air from second regions of the adsorbent means which are in the second mode of operation simultaneously as said first regions are in said first mode of operation and for guiding said ambient air through said first regions into said pollutant conduit.

7. An assembly according to claim 1, further comprising energy valve means for at least partially opening or closing said energy transfer means, wherein said mode control means are arranged for causing said energy valve means to at least partially close when approaching or in said first mode of operation, and to at least partially open when approaching or in said second mode of operation.

8. An assembly according to claim 1, further comprising detecting means for detecting an air/fuel ratio between said air for internal combustion and said organic fuel, and combustion control means for adjusting said ratio, wherein the mode control means and the detecting means are arranged for providing information to said combustion control means used for controlling said air/fuel ratio.

9. An assembly according to claim 1, wherein a pathway for the polluted ambient air passes through both said energy emitting means and said adsorbent means, wherein said energy emitting means and said adsorbent means are arranged next to each other.

10. An assembly according to claim 1, wherein the internal combustion engine further comprises exhaust gas outlet means for emitting said exhaust gas into said ambient air via exhaust gas purifying means.

11. An assembly according to claim 1, wherein the exhaust gas purifying means comprise both a hydrocarbon trap and a catalytic converter.

12. An assembly according to claim 1, wherein the energy emitting means comprise a radiator, an air conditioner condenser, an engine oil cooling circuit, a transmission oil cooler, a power steering fluid cooler, an air charge cooler, an electric generator or moving ambient air.

13. An assembly according to claim 1, wherein the energy carrier comprises cooling medium, motor oil, charge air, electricity or ambient air moving in relation to a vehicle.

14. An assembly according to claim 1, wherein the pollutant comprises carbon monoxide, hydrocarbons, nitrogen oxides, ozone or sulfur oxides.

15. An assembly according to claim 1, wherein the adsorbent means comprise a pelleted or granular material, a monolithic honeycomb, a ceramic foam or a honeycomb filter containing or coated with an adsorption-promoting agent such as a zeolite, cordierite, active carbon, mullite or silicon carbide, enabling said adsorbent means to act as a combined mechanical and chemical trap for said pollutant when in said first mode of operation.

16. A method for cleaning ambient air in the vicinity of an internal combustion engine, comprising:

providing an internal combustion engine, having combustion air inlet means for providing air for internal combustion of an organic fuel and energy emitting means for emitting energy;

providing adsorbent means having an inlet for polluted ambient air and an outlet for cleaned ambient air;

absorbing at least one pollutant in said adsorbent means when in a first mode of operation; and desorbing said adsorbed pollutant when in a second mode of operation, wherein the method further comprises:

providing a pollutant conduit;

bringing said adsorbent means into said second mode of operation by means of said energy supplied from said energy emitting means;

transferring said desorbed pollutant from said adsorbent means to said combustion air inlet means through said pollutant conduit when in said second mode of operation;

combusting said pollutant in said internal combustion engine in order to create an exhaust gas; and bringing said adsorbent means back into said first mode of operation.

17. A method according to claim 16, wherein the method further comprises:

providing an energy transfer means for transferring said energy from said energy emitting means to said adsorbent means by means of an energy carrier;

providing pollutant transport means for transporting said desorbed pollutant through said pollutant conduit when activated;

providing mode control means for acting on said energy transfer means and said pollutant transport means; and, to maintain a first energy level in said adsorbent means and deactivate said pollutant transport means by means of said mode control means in order to induce said first mode of operation and adsorption of said pollutant; and maintaining a second energy level, higher than said first energy level, in said adsorbent means and activate said pollutant transport means by means of said mode control means in order to induce said second mode of operation and desorption of said pollutant.

18. A method according to claim 17, wherein the energy carrier comprises cooling medium, motor oil, charge air, electricity or ambient air.

19. A method according to claim 16, wherein the internal combustion engine her is provided with exhaust gas outlet means which emit said exhaust gas into said ambient air via exhaust gas purifying means when said internal combustion engine is running.

20. A method according to claim 19, wherein the exhaust gas purifying means comprise both a hydrocarbon trap and a catalytic converter.

21. A method according to claim 16, wherein air blocking means are provided and induce entry into the second mode of operation by means of blocking the passage for ambient air through at least a region of the adsorbent means, and that said air blocking means induce entry into the first mode of operation by means of opening the passage for ambient air through said region of the adsorbent means.

22. A method according to claim 16, wherein the method further comprises to provide energy valve means for at least partially opening or closing said energy transfer means and, be means of said mode control means to cause said energy valve means to at least partially close when inducing or in said first mode of operation and to at least partially open when inducing or in said second mode of operation.

23. A method according to claim 16, wherein means for controlling the energy level of said energy carrier before said energy carrier reaches the adsorbent means are provided and induce entry into said first or second mode of operation.

24. A method according to claim 16, further comprising providing detecting means for detecting an air/fuel ratio between said air for internal combustion and said organic fuel, and combustion control means for adjusting said air/fuel ratio, wherein the mode control means and the detecting means provide information to said combustion control means which is used for controlling said air/fuel ratio.

25. A method according to claim 16, wherein the polluted ambient air passes through both the energy emitting means and the adsorbent means, and that said adsorbent means and energy emitting means are arranged next to each other.

26. A method according to claim 16, wherein the energy emitting means comprise a radiator, an air conditioner condenser, an engine oil cooling circuit, a transmission oil cooler, a power steering fluid cooler, an air charge cooler, an electric generator or ambient air moving in relation to a vehicle.

27. A method according to claim 16, wherein the pollutant comprises carbon monoxide, hydrocarbons, nitrogen oxides, ozone or sulfur oxides.

28. A method according to claim 16, wherein the adsorbent means comprise a pelleted or granular material, a monolithic honeycomb, a foam or a honeycomb filter containing or coated with an adsorption-promoting agent such as a zeolite, cordierite, active carbon, mailed or silicon carbide, whereby said adsorbent means act as a combined mechanical and chemical trap for said pollutant when in said first mode of operation.

* * * * *